United States Patent [19]

Soto

[11] 3,878,588
[45] Apr. 22, 1975

[54] SEPARABLE FASTENER ASSEMBLY
[76] Inventor: William S. Soto, P.O. Box 392, Hillburn, N.Y. 10931
[22] Filed: Feb. 25, 1974
[21] Appl. No.: 445,671

[52] U.S. Cl. .................................... 24/208; 24/213
[51] Int. Cl. ............................................. A47b 17/00
[58] Field of Search ............ 24/208 A, 213 CS, 214, 24/213, 215, 216, 218

[56] References Cited
UNITED STATES PATENTS
3,466,714   9/1969   Nysten ............................... 24/208 A
3,543,763   12/1970   Porco ..................................... 24/73

Primary Examiner—Paul R. Gilliam
Assistant Examiner—Doris L. Troutman
Attorney, Agent, or Firm—Ryder, McAulay, Fields, Fisher & Goldstein

[57] ABSTRACT

A separable fastener assembly for releasably connecting together materials which is adapted to be mounted on material without the need for special tools, sewing or the like. A first fastening element, which may comprise a stud portion, is adapted to releasably mate with a second fastening element which may comprise a keeper arrangement. Each fastening element has a support wall and a peripheral wall which extends transversely from the support wall. Retaining means is provided which is adapted to be moved into engagement with the fastening element to mount the fastening element on the material. The retaining means comprises an opening defined by a peripheral wall which is sized to receive therein the fastening means peripheral wall with the material sandwiched therebetween. The peripheral walls of the fastening element and the retaining means are resilient and have substantially the same normal position when they are in the disengaged or in the engaged position. Projecting mating or cooperating means are provided on the fastening element and the retaining means for displacing the resilient peripheral walls from the normal position as the fastening element and the retaining means are moved to the engaged position and which are engageable with each other when the fastening element and the retaining means are in the engaged position to thereby mount the fastening element on the material.

14 Claims, 6 Drawing Figures

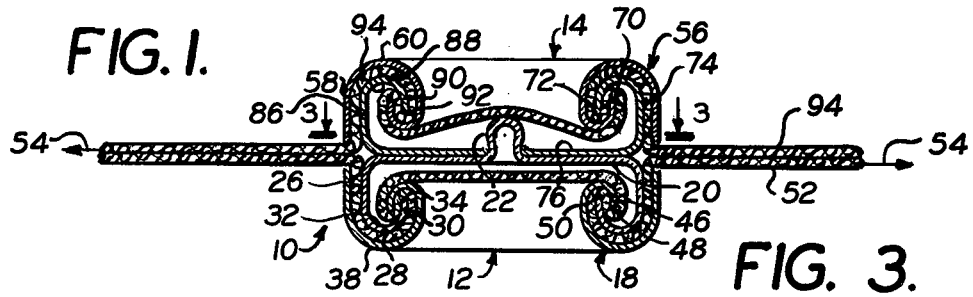
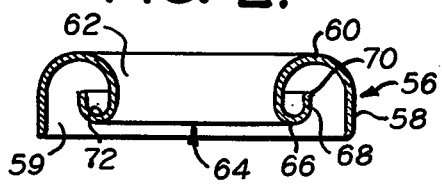
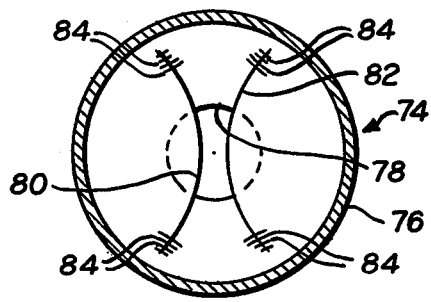
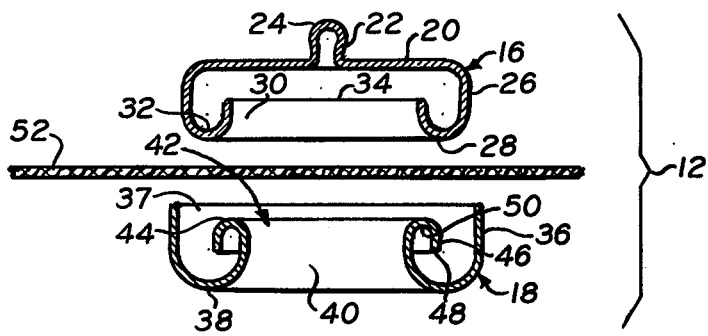
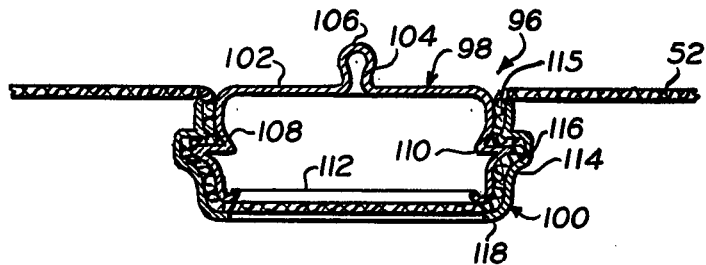
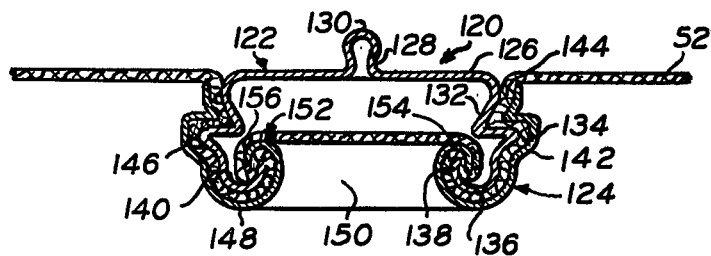

3,878,588

SEPARABLE FASTENER ASSEMBLY

This invention relates generally to a separable fastener assembly and, more particularly, relates to a fastening element that is mounted on material without the need for speical tools or the like.

Separable fasteners have long been utilized to releasably connect together pieces of material or the like. In particular, separable fasteners have numerous advantages such as: providing a means to quickly connect or disconnect two pieces of material; the ability to withstand long and continuous rough use; and they are relatively inexpensive. However, a problem is presented in mounting the fasteners on the material. In most cases, special tools are required to affix a fastener in place as most fasteners require that a portion be deformed during the mounting procedure. Moreover, differently sized tools must be utilized for the different sizes of fasteners. This is particularly disadvantageous for home sewers since the cost for such tools is relatively expensive compared with the cost of the fasteners and some degree of dexterity and strength is required for the operation of such tools.

On the other hand, some light duty fasteners have been provided, particularly for the home sewer market, which can be sewn on the material or fabric. However, this method of affixation is somewhat annoying since it is extremely time consuming and it has been found that the holding threads tear after a relatively short period of time.

Accordingly, an object of this invention is to provide an improved separable fastener assembly.

A more specific object of the invention is the provision of a separable fastener that can easily and quickly be connected to a piece of material without the need for special tools, sewing or the like.

Another object of the present invention is to provide a separable fastener having a self-locking feature to permanently mount the fastener on the material.

A further object of the invention resides in the novel details of the construction that provide a separable fastener of the type described that is economical to produce and reliable in operation.

Accordingly, a separable fastener constructed according to the present invention is adapted to releasably connect together materials and comprises a first fastening element which is adapted to releasably connect with a second fastening element. The first fastening element is provided with a fastening support wall and a peripheral wall which extends transversly from the support wall. Retaining means is provided which is adapted to mount the element on the material. The retaining means comprises an opening defined by a peripheral wall which is sized to receive therein the first fastening element peripheral wall when the element and the retaining means are in engagement. At least one of the peripheral walls of the first fastening element and the retaining means is resilient and has substantially the same normal position when the first fastening element and the retaining means are either in the engaged or disengaged position. Projecting cooperating means is provided on the first fastening element and retaining means peripheral walls for displacing the resilient wall from the normal position as the element and the retaining means are moved into engagement and are engageable with each other when the first fastening element and the retaining means are in the engaged position to permanently mount the fastening element on the material.

Other features and advantages of the present invention will become more apparent from a consideration of the following detailed description when taken in conjunction with the accompanying drawings in which:

FIG. 1 is a vertical sectional view of a separable fastener assembly constructed according to the present invention, showing the interrelationship of the parts in the engaged or assembled position;

FIG. 2 is a detailed sectional view of the retainer for the upper portion of the assembly shown in FIG. 1;

FIG. 3 is a sectional view taken along the line 3—3 of FIG. 1 showing the female fastener element;

FIG. 4 is an exploded sectional view of the male fastener element and retainer in the disengaged position;

FIG. 5 is a vertical sectional view of a modified embodiment of the invention, showing the male fastener portion; and FIG. 6 is a vertical sectional view of a further modified embodiment of the separable fastener assembly of the present invention showing the male fastener portion.

A separable fastener assembly constructed according to the present invention is designated generally by the reference character 10 in FIG. 1 and comprises a male portion 12 and a female portion 14. As is conventional in constructions of the type under consideration, the fasteners have a generally circular configuration. The male portion 12 is shown more particularly in the disassembled or disengaged position in FIG. 4 and includes a fastening element 16 and a retainer 18. The element 16 includes a generally circular upper support wall 20 having a centrally located upstanding stud 22 provided with an enlarged head 24. The stud 22 is adapted to be releasably retained by the female portion 14 in the conventional manner.

Depending from the surface 20 and, in the embodiment under consideration, formed integral therewith is a circular transverse peripheral wall 26. Extending radially inwardly from the wall 26 is a connecting wall 28 that terminates in a wall 30 that is in generally parallel and facing relationship to the wall 26 and extends upwardly toward the wall 20 and terminates therebelow. The wall 30, connecting wall 28 and peripheral wall 26 define an annular groove or recess 32 in the fastening element 16. The wall 30 and connecting wall 28 may be formed integral with the circular peripheral wall 26 so that the fastening element 16 is essentially a unitary integral structure. Additionally, the wall 28 may be curved convexly as seen looking up from the bottom of the element 16 and the upper edge 34 of the wall 30 may be rounded to prevent tearing of the material when the fastener is assembled, as noted in greater detail below.

The retainer 18 comprises a circular peripheral wall 36 that defines an opening 37 having a greater diameter than the wall 26. A bottom radially inwardly extending connecting wall 38 is formed integral with the peripheral wall 36 and terminates in an upstanding integral wall 40 that extends upwardly in generally parallel and facing relationship to the wall 36 and terminates below the top edge of the wall 36. The wall 40 terminates at its upper end in an integral lip portion 42 having a radially outwardly extending connecting wall 44 and a downwardly extending wall 46 that is positioned between the walls 40 and 36 and which terminates in a rounded edge 48 that is spaced above the connecting wall 38. An annular groove or recess 50 is defined between the walls 46 and 40.

The connecting wall 38 is curved concavely and the connecting wall 44 is curved convexly as viewed from the bottom of the retainer 18. Additionally, the radius of curvature of the wall 38 is greater than the radius of curvature of the wall 32. The distance between the walls 30 and 26 of the fastening element 16 is slightly greater than the distance between the wall 46 and the wall 36 of the retainer 18. Moreover, the height of the wall 30 is slightly less than the distance between the edge 48 of the wall 46 and the bottom connecting wall 38 of the retainer 18.

The fastening element 16 and the retainer 18 are fabricated from a resilient material such as a styrene type plastic or the like. While it is contemplated that the peripheral walls 26 and 36 and the engaging portions connected thereto be resilient, it is emphasized that for the purposes of this invention, only one of the peripheral walls 26 and 36 need be resilient.

In operation, the material 52 on which the fastening element is to be mounted is positioned between the fastening element 16 and the retainer 18, as shown in FIG. 4. The fastening element 16 and the retainer 18 are then moved toward each other until the connecting wall 28 engages the material 52. Further movement toward each other of the fastening element 16 and retainer 18 causes the material 52 to enter the opening 37. Continued movement of the element 16 and retainer 18 toward each other causes the wall 30 to slidingly engage the wall 46. This action causes the wall 30 to move outwardly and the wall 46 to move inwardly since the spacing between the walls 30 and 26 is greater than the spacing between the walls 36 and 46. At this point, the material 52 will also extend between the walls 30 and 46. The element 16 and retainer 18 are moved toward each other until the connecting wall 28 abuts the wall 38. At this point, the edge 34 of the wall 30 will clear the edge 48 of the wall 46. Since the walls are resilient, the wall 30 will then spring radially outwardly whereby the edge 34 will be received within the groove 50 and the edge 48 of the wall 46 will be received within the groove 32 of the element 16, thereby locking the element and retainer together and permanently mounting the fastening element 16 on the material 52, as shown in FIG. 1.

It is to be noted that the position of the parts of the element and retainer are the same when they are either engaged or disengaged. More specifically, the connecting walls and the upstanding or inturned walls in both the element and the retainer may be thought of as cooperating means on the peripheral walls which mate with each other to mount the fastening element on the material. Additionally, the peripheral walls and cooperating means may be thought of as being in a normal position when the element and retainer are both engaged and disengaged and which are adapted to be displaced from the normal position during the assembly of the element and the retainer and which spring back to the normal position subsequent to assembly to thereby lock the element and retainer together.

As shown in FIG. 1, the material 52 extends between the walls 26 and 36 and around the edges 34 and 48 of the fastening element and the retainer. Hence, if the material 52 is pulled axially in the directions indicated by the arrowheads 54 in FIG. 1, an upward force will be exerted on the bottom connecting wall 28 of the fastening element 16 thereby driving the element into tighter engagement with the retainer 18. This feature is to be distinguished from prior art constructions wherein such axial forces 54 applied to the material would cause the element and retainer to separate rather than be driven into tighter engagement. The rounded edges and walls of the element and retainer prevent the parts of the fastener from digging into and tearing the material both during and subsequent to assembly.

The mounting features and construction of the female portion 14 of the assembly 10 are similar to that of the male portion 12 except that the respective tops and bottoms are reversed because the female portion occupies the top section of the assembly. However, it is emphazied that top and bottom as shown in FIG. 1 are only relative and not to be interpreted as being a limitation of the present invention. That is, the male portion 12 may just as well occupy the top section of the assembly in which case the retainer 18 is turned upside down and positioned above the material 52 of FIG. 4 and the fastening element 16 is turned upside down and positioned below the material 52. For this latter case, the element 16 and the retainer 18 are again connected together by the method noted above.

The female portion 14 includes a retainer 56 (FIG. 2) having a circular peripheral wall 58 that defines an opening 59 and a radially inwardly extending connecting wall 60 at the top thereof that terminates in an integral transversely or downwardly extending inner wall 62 which, in turn, terminates in a lip portion 64. The lip portion includes a radially outwardly extending connecting wall 66 and an upwardly extending wall 68 that is in generally parallel and facing relationship to the walls 58 and 62 and is positioned therebetween. The wall 68 terminates in a rounded edge 70 that is spaced from the connecting wall 60. As viewed from the bottom, the wall 60 is curved concavely and the wall 66 is curved convexly. An annular groove 72 is defined by the walls 68, 62 and 66.

The female portion 14 further includes a fastening element 74 (FIGS. 1 and 3) having a circular support wall 76 provided with a centrally located aperture 78. The aperture 78 is sized so that the stud 22 will easily fit therethrough. Arcuate spring members 80 and 82 are mounted on the wall 76 in facing relationship to each other by placing the ends of the spring members in upstruck bands 84 on the fastening surface and deforming the bands to retain the members 80 and 82 in place. The members are positioned to overlie the aperture 78 and the spacing of the members is such as to be approximately equal to the narrow necked portion of the stud 22. Accordingly, when the stud 22 is inserted through the aperture 78, the enlarged head 24 will separate the spring members 80 and 82 until the head passes therebeyond whereupon the members 80 and 82 will again assume their normal position in engagement with the narrow necked portion of the stud. When the fastening elements are separated, a separating force is applied to the elements 16 and 74 thereby again causing the spring members 80 and 82 to separate and permit the enlarged head 24 of the stud to pass through the aperture 78.

The element 74 is provided with an integral upstanding or transverse circular peripheral wall 86 that terminates in a radially inwardly extending curved connecting wall 88 that, in turn, terminates in an integral downwardly extending wall 90 that is is generally parallel and facing relationship to the wall 86. The bottom edge 92 of the wall 90 is rounded and terminates above the surface 76. The walls 90, 88 and 86 define an annular groove 94 therebetween.

The spacing between the various parts of the retainer 56 and the fastening element 74 and similar to the spacings between the corresponding parts of the fastening element 16 and the retainer 18. That is, the spacing between the walls 68 and 58 is slightly smaller than the spacing between the walls 86 and 90 of the fastening element 74. Moreover, the retainer 56 and the fastening element 74 are fabricated from a resilient and preferably plastic material. The element 74 and retainer 56 are respectively positioned below and above the material 94 and are assembled in the same manner as the fastening element 16 and retainer 18 thereby to provide a complete fastener assembly.

The male portion 96 of a modified embodiment of a separable fastener constructed according to the present invention is shown in FIG. 5, it being understood that the female portion will simply be an upside-down version of the male portion wherein the parts of the female portion will bear the same relation to the male portion as the female portion 14 bears to the male portion 12 in the separable fastener assembly 10.

Accordingly, the male portion 96 comprises a fastening element 98 and a retainer 100. The fastening element 98 includes a circular support wall 102 having a centrally located upstanding stud 104 provided with an enlarged head 106. Depending from the wall 102 is a circular peripheral wall 108 which may be formed integral with the wall 102. The wall 108 is provided with a radially outwardly extending annular projection 110 intermediate the ends thereof. Additionally, the bottom edge of the wall 108 is rounded at 112 so that the edge will not tear the material when the element 98 and the retainer 100 are assembled.

The retainer 100 has a generally cup-shaped configuration and includes a circular peripheral wall 114 which defines an opening 115 of greater diameter than the wall 110. The wall 114 is provided with a radially outwardly extending recess 116 on its inner surface which is adapted to matingly receive the annular projection 110 therein. The wall terminates at its lower end in an annular flange 118. The element 98 and the retainer 100 may be fabricated from a resilient plastic material.

When assembling the male portion 96, the element 98 is placed above the material 52 and the retainer 100 is placed below the material and the element is moved toward the retainer until bottom edge of the element engages the material and pushes the material into the opening 115 defined by the wall 114. Continued movement of the element and the retainer toward each other will cause the projection 110 to engage the upper portion of the wall 114 thereby causing the wall 114 to move outwardly and the wall 108 to move inwardly. Movement of the element and the retainer toward each other continues until the projection 110 is received within the recess 116. The assembled position of the element and the retainer is shown in FIG. 5, wherein the material 52 extends between the walls 108 and 114 and between the flange 118 and the rounded edge 112.

The male portion of a further modified embodiment of a fastener assembly constructed according to the present invention is shown in FIG. 6 and essentially combines the locking features shown in FIGS. 4 and 5 to provide an extremely durable construction. The male portion designated generally by the reference character 120 also includes a fastening element 122 and a retainer 124. The fastening element 122 includes a circular support wall 126 having a centrally located upstanding stud 128 provided with an enlarged head 130. Extending downwardly or transversely from the wall 126 and integral therewith is a circular peripheral wall 132. The wall 132 is provided with a radially outwardly extending annular projection 134 intermediate the ends of the wall. The wall terminates in a radially inwardly extending curved connecting wall 136 to which is connected an upwardly extending wall 138. The walls 138, 136 and 134 define an annular groove 140 therebetween. The fastening element 122 is an integral structure and is preferably fabricated from a resilient plastic.

The retainer 124 includes a circular peripheral wall 142 which defines an opening 144 of greater diameter than the wall 132. The wall 142 is provided with a radially outwardly extending recess 146 on the inner surface thereof which is adapted to matingly receive the projection 134. The wall terminates in a curved radially inwardly extending connecting wall which, in turn, terminates in an upstanding wall 150 that is in facting relationship to the wall 142. The wall 150 is provided with a lip portion 152 comprising a curved radially outwardly extending connecting wall 154 and a downwardly extending wall 156 that is located between the walls 150 and 142 and which terminates above the connecting wall 148. The retainer 124 is also fabricated from a resilient material.

In assembling the element 122 and the retainer 124, the element 122 is positioned above the material 52 and the retainer 124 is positioned below the material. The fastening element is moved downwardly into the opening 144 with the material therebetween so that the material extends between the walls 142 and 132 and about the curved connecting walls as shown in FIG. 6. As in the construction of FIGS. 1–4, the space between the walls 138 and 132 is slightly greater than the space between the wall 156 and the wall 142 so that when the element 122 is firmly seated in place, the wall 156 will be received within the groove 140. Additionally, the wall 144 and the wall 132 will be displaced slightly during assembly until the projection 134 mates with the recess 146.

Accordingly, a separable fastener assembly has been described that is easily assembled without the need for specialized tools or sewing or the like and which is reliable in operation.

While preferred embodiments of the invention have been shown and described herein, it will become obvious that numerous omissions, changes and additions may be made in such embodiments without departing from the spirit and scope of the present invention. For example, different sets of fastening assemblies may be offered wherein the spacing between the fastening element and the retainer in the assembled position is different in each set so that each set accomodates different thickness of material.

What is claimed is:

1. A separable fastener for releasably connecting together materials comprising a first fastening element adapted to releasably connect with a second fastening element, said first fastening element having a support wall, connect means on said support wall, and a peripheral wall extending transversely from said support wall; and retaining means movable from a disengaged to an engaged position with said first fastening element, said retaining means comprising a peripheral wall defining an opening sized to receive therein said first fastening element peripheral wall with the material therebetween, said respective cooperating means on said first fastening element and said retaining means peripheral walls engageable with each other when said first fastening element and said retaining means are in the engaged position, at least one of the peripheral walls of said first fastening means and said retaining means peripheral walls and the cooperating means thereon being resilient and having substantially the same normal position when said first fastening element and said retaining means are in the engaged and the disengaged position, said cooperating means extending a distance sufficient to displace said resilient wall and cooperating means from said normal position during movement of said first fastening element and said retaining means to the engaged position.

2. A separable fastener as in claim 1, in which said support wall is circular, and cocmprises a stud having an enlarged head upstanding from said circular wall.

3. A separable fastener as in claim 1, in which said support wall is circular, and comprises a through bore in said circular wall, said spring members in opposed spaced relationship on said surface and overlying said through bore and adapted to be displaced from a normal position when a stud member is inserted through said bore and to biasingly engage said stud member to retain said stud member therein.

4. A separable fastener as in claim 1, in which said cooperating means comprises a wall connected to said first fastening element peripheral wall and having an inner wall portion extending toward said support surface and generally parallel to said peripheral wall to define a first groove therebetween, and an inner wall portion on said retaining means peripheral wall extending generally parallel to said peripheral wall and connected thereto by a connecting wall, and an outwardly curved lip portion having an outer wall portion extending downwardly toward said connecting wall and generally parallel to said inner wall portion to define a second groove therebetween, whereby said inner wall portion of said first fastening element is received in said second groove said outer wall portion of said retaining means is received in said first groove when said first fastening element and said retaining means are in the engaged position.

5. A separable fastener as in claim 4, in which said first fastening element and said retaining means have generally circular configurations, and the space between the edge of said outer wall portion and said connecting wall of said retaining means is slightly larger than the height of said inner wall portion of said first fastening element.

6. A separable fastener as in claim 5, in which the distance between said peripheral wall and said inner wall portion of said first fastening element is slightly greater than the corresponding distance between said peripheral wall and said outer wall portion of said retaining means.

7. A separable fastener as in claim 4, in which said cooperating means further comprises an outwardly extending recess on said retaining means peripheral wall, and an outwardly extending projection on said first fastening element peripheral wall adapted to be received in said recess when said first fastening element and said retaining means are in the engaged position.

8. A separable fastener as in claim 1, in which said cooperating means comprises an outwardly extending recess on said retaining means peripheral wall, and an outwardly extending projection on said first fastening element peripheral wall adapted to be received in said recess when said first fastening element and said retaining means are in the engaged position.

9. A separable fastener assembly for releasably connecting together materials comprising a fastening element having a circular support wall having fastening means thereon, and a transversely extending peripheral wall connected to said support wall; and retaining means adapted to be assembled with said fastening element for mounting said fastening element on the material, said retaining means comprising a peripheral wall defining an opening therein of slightly greater diameter than the diameter of said fastening element peripheral wall and receiving said fastening element peripheral wall therein with the material sandwiched therebetween, said respective first and second mating means on said fastening element and said retaining means peripheral walls engageable with each other to lock together said fastening element and said retaining means in the assembled position, at least one of said peripheral walls and the associated mating means being resilient and residing in an normal position before and subsequent to the assembly of said fastening element and said retaining means and being displaceable therefrom during assembly of said fastening element and said retaining means, at least one of said first and second mating means projecting from the associated peripheral wall a distance sufficient to engage with said resilient peripheral wall to displace said one peripheral wall and the associated mating means from said normal position during assembly of said fastening element and said retaining means.

10. A separable fastener assembly as in claim 9, in which said fastening element and said retaining means are fabricated from a resilient plastic.

11. A separable fastener assembly as in claim 9, in which said first mating means comprises a radially inwardly extending connecting wall, and an upstanding wall connected to said connecting wall and extending toward said support wall and terminating below said support wall, said peripheral wall, connecting wall and upstanding wall defining a first annular groove; said second mating means comprising a radially inwardly extending connecting wall, a wall upstanding from said second mating means connecting wall in facing relationship to said retaining means peripheral wall, and a lip portion extending radially outwardly from said upstanding wall and downwardly between said upstanding wall and said peripheral wall of said retaining means and terminating short of said retaining means connecting wall; said lip portion engaged within said first groove and the material sandwiched therebetween when said fastening element and said retaining means are assembled.

12. A separable fastener assembly as in claim 11, in which the radial extent of said fastener element connecting wall is greater than the space between said retaining means peripheral wall and the downward extension of said lip portion.

13. A separable fastener assembly as in claim 9, in which said first mating means comprises a radially outwardly extending annular projection on said fastening element peripheral wall, and said second mating means comprises a radially outwardly extending annular recess in said retaining means peripheral wall receiving said annular projection therein with the material received between said pheripheral walls when the fastening element and retaining means are assembled.

14. A separable fastener assembly as in claim 12, in which said first mating means further comprises a radially outwardly extending annular projection on said fastening element peripheral wall, and said second mating means further comprises a radially outwardly extending annular recess in said retaining means peripheral wall receiving said annular projection therein with the material received between said peripheral walls when the fastening element and retaining means are assembled.

* * * * *